(12) United States Patent
Yamada

(10) Patent No.: US 7,817,572 B2  
(45) Date of Patent: Oct. 19, 2010

(54) COMMUNICATIONS APPARATUS AND COMMUNICATION METHOD

(75) Inventor: Kenshin Yamada, Tokyo (JP)

(73) Assignee: NEC Corporation, Tokyo (JP)

( * ) Notice: Subject to any disclaimer, the term of this patent is extended or adjusted under 35 U.S.C. 154(b) by 759 days.

(21) Appl. No.: 11/708,347

(22) Filed: Feb. 21, 2007

(65) Prior Publication Data

US 2007/0206598 A1 Sep. 6, 2007

(30) Foreign Application Priority Data

Mar. 2, 2006 (JP) ............................ 2006-055969

(51) Int. Cl. *G01R 31/08* (2006.01)
(52) U.S. Cl. .................... 370/252; 370/394; 370/395.7
(58) Field of Classification Search ................. 370/252, 370/392, 394, 395.7, 395.71, 412, 413, 463; 709/250, 230; 710/22, 52

See application file for complete search history.

(56) References Cited

U.S. PATENT DOCUMENTS

2004/0037319 A1* 2/2004 Pandya ........................ 370/469
2006/0050690 A1* 3/2006 Epps et al. .................. 370/359

FOREIGN PATENT DOCUMENTS

| JP | 2-181248 | 7/1990 |
| JP | 3-203445 | 9/1991 |
| JP | 9-149067 | 6/1997 |
| JP | 10-341419 | 12/1998 |
| JP | 2004-7354 | 1/2004 |

OTHER PUBLICATIONS

"RDMA Protocol Verbs Specification (Version 1.0)," pp. 191-201, and "An RDMA Protocol Specification (Version 1.0)," pp. 4-7, Oct. 21, 2002.
"An RDMA Protocol Verbs Specification (Version 1.0)," pp. 191-201, "An RDMA Protocol Specification (Version 1.0)," pp. 407, Apr. 25, 2002.
Hiroshi Suda, et al. IPv6 wo Riyoshita CATV kan de no Eizo Ryutsu System no Kochiku,' Information Processing Society of Japan Kenkyu Hokoku, AMV-39-1, vol. 2002, No. 120, IPSJ SIG Notes, Dec. 17, 2002, p. 3, left column.
PCT Forms PCT/IB/338 and IPEA/409.

* cited by examiner

*Primary Examiner*—Jayanti K Patel
*Assistant Examiner*—Jung Park
(74) *Attorney, Agent, or Firm*—McGinn IP Law Group, PLLC (57) ABSTRACT

A communications apparatus for directly transferring payload data included in a received packet to an application memory area. The communications apparatus comprises an error check unit for checking the payload data for an error, a write processing unit for performing write processing for writing the payload data into the application memory area, and a protocol processing unit for causing the write processing unit to start write processing to write the payload data into the application memory without waiting for the completion of the error check, and upon detection of an error, returning a valid section in the application area that has been overwritten by write processing to an invalid section which has not stored normal data.

5 Claims, 9 Drawing Sheets

COMMUNICATIONS APPARATUS AND COMMUNICATION METHOD

BACKGROUND OF THE INVENTION

1. Field of the Invention

The present invention relates to a communications apparatus, and more particularly, to a communications apparatus which has a function of writing payload data included in a received packet directly into a buffer of an application program.

2. Description of the Related Art

Generally, a computer has a network interface card to make communications with other computers and devices through the network interface card.

A technique called RDMA (remote direct memory access) is utilized particularly in the field of parallel computing where the communication performance significantly affects a system. RDMA is a technique which allows a data recipient to directly transfer payload data in a received packet to a memory space utilized by an application program (hereinafter called the "application") without the intervention of an OS space managed by an operating system (OS). By thus reducing the number of times transferred data is copied into buffers, it is possible to improve the performance and reduce communication latency, resulting from a reduction in the processing load on a processor. Recently, in particular, iWARP which is a protocol for utilizing RDMA on TCP/IP, which is a standard protocol of the Internet, has been standardized by RDMA Consortium shown in "RDMA Protocol Verbs Specification (Version 1.0)," pp 191-201, and "An RDMA Protocol Specification (Version 1.0)," pp 4-7.

Figure 1:
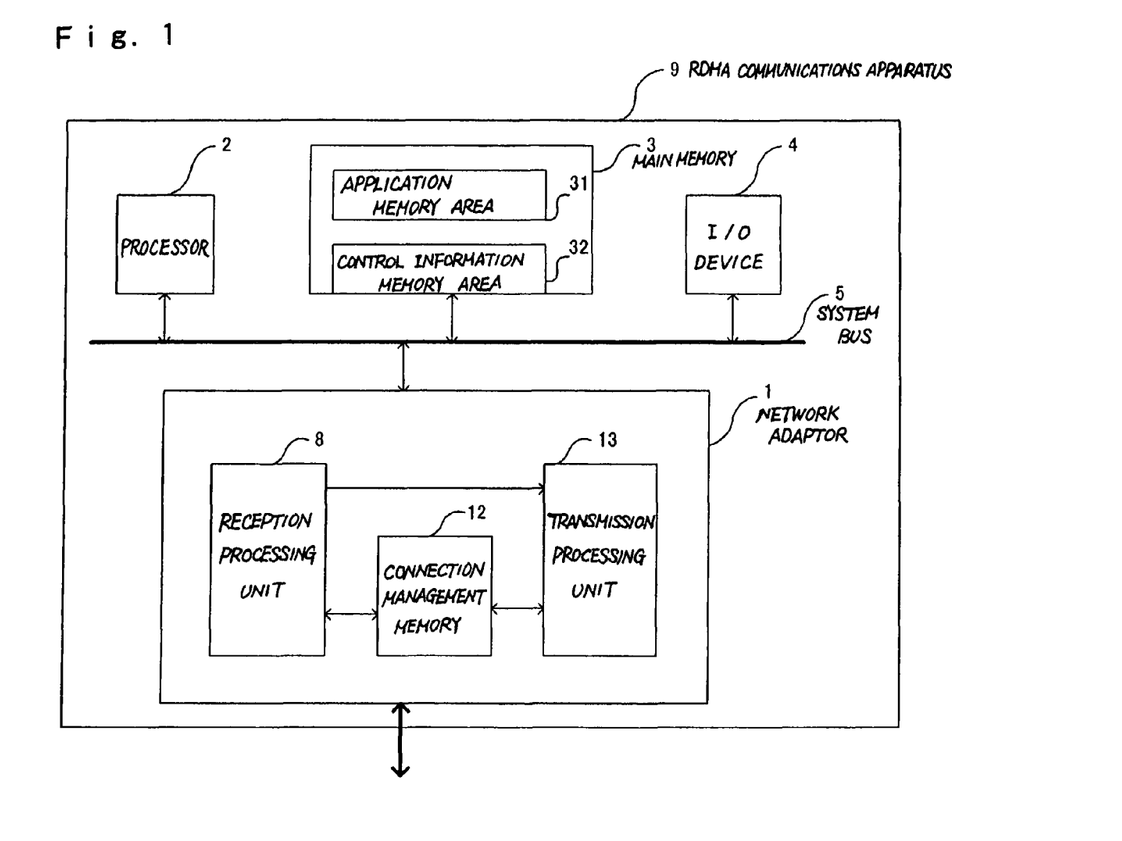
FIG. 1 is a block diagram illustrating an exemplary configuration of an RDMA communications apparatus.

FIG. 1 illustrates an exemplary configuration of an RDMA communications apparatus which is based on RDMA to make communications. Referring to FIG. 1, RDMA communications apparatus 9 comprises network adaptor 1, processor 2, main memory 3, I/O device 4, and system bus 5 which interconnects these components.

Main memory 3 has two memory areas, i.e., application memory area 31 which is a memory area for an application to perform processing, and control information memory area 32 which is a memory area for a communication protocol to manage control information. Network adaptor 1 comprises reception processing unit 8, transmission processing unit 13, and connection management memory 12.

To make an RDMA-based communication between RDMA communications apparatus 9 and another RDMA communications apparatus 9, processor 2 in RDMA communications apparatus 9 on the transmission side sets the delivery for transmit data stored in application memory area 31 in control information memory area 32, and requests network adaptor 1 to make a packet transmission. Transmission processing unit 13 in network adaptor 1 finds the location at which the transmit data is stored from control information memory area 32 to read the transmit data from application memory area 31. Transmission processing unit 13 further reads connection information required to send packets from connection management memory 12, creates transmit packets, and delivers the packets to RDMA communications apparatus 9 on the reception side. Connection management memory 12 updates the connection information as required, and stores the updated connection information in connection management memory 12.

In RDMA communications apparatus 9 on the reception side, a packet received from RDMA communications apparatus 9 on the transmission side is supplied to reception processing unit 8 of network adaptor 1. Reception processing unit 8 identifies a connection from a header section of the received packet to read connection information from connection management memory 12. Reception processing unit 8 further determines from which address a payload section of the received packet should be written into application memory area 31 from information described in the header of the received packet and the connection information, to write the payload section of the received packet into application memory area 31. Reception processing unit 8 updates the connection information as required to update connection management memory 12.

In regard to a connection established between RDMA communications apparatus 9 on the transmission side and RDMA communications apparatus 9 on the reception side, information for identifying application memory area 31 (the identifier, start address, and size of a buffer used as application memory area 31), and the current status of application memory area 31 into which data can be written (for example, a list of normally received sequence numbers) may be held in connection management memory 12, and the start sequence number and size of data included in payload data may be contained in the header section of the received packet, so that the location in which the payload data should be written can be identified from the information described in the header of the received packet, and the connection information. Detailed descriptions on a standard method of implementing RDMA communications can be found in the aforementioned "RDMA Protocol Verbs Specification (Version 1.0)," pp 191-201, and "An RDMA Protocol Specification (Version 1.0)," pp 407, including how the payload write location is specifically identified from the information described in the header of the received packet and the connection information.

Figure 2:
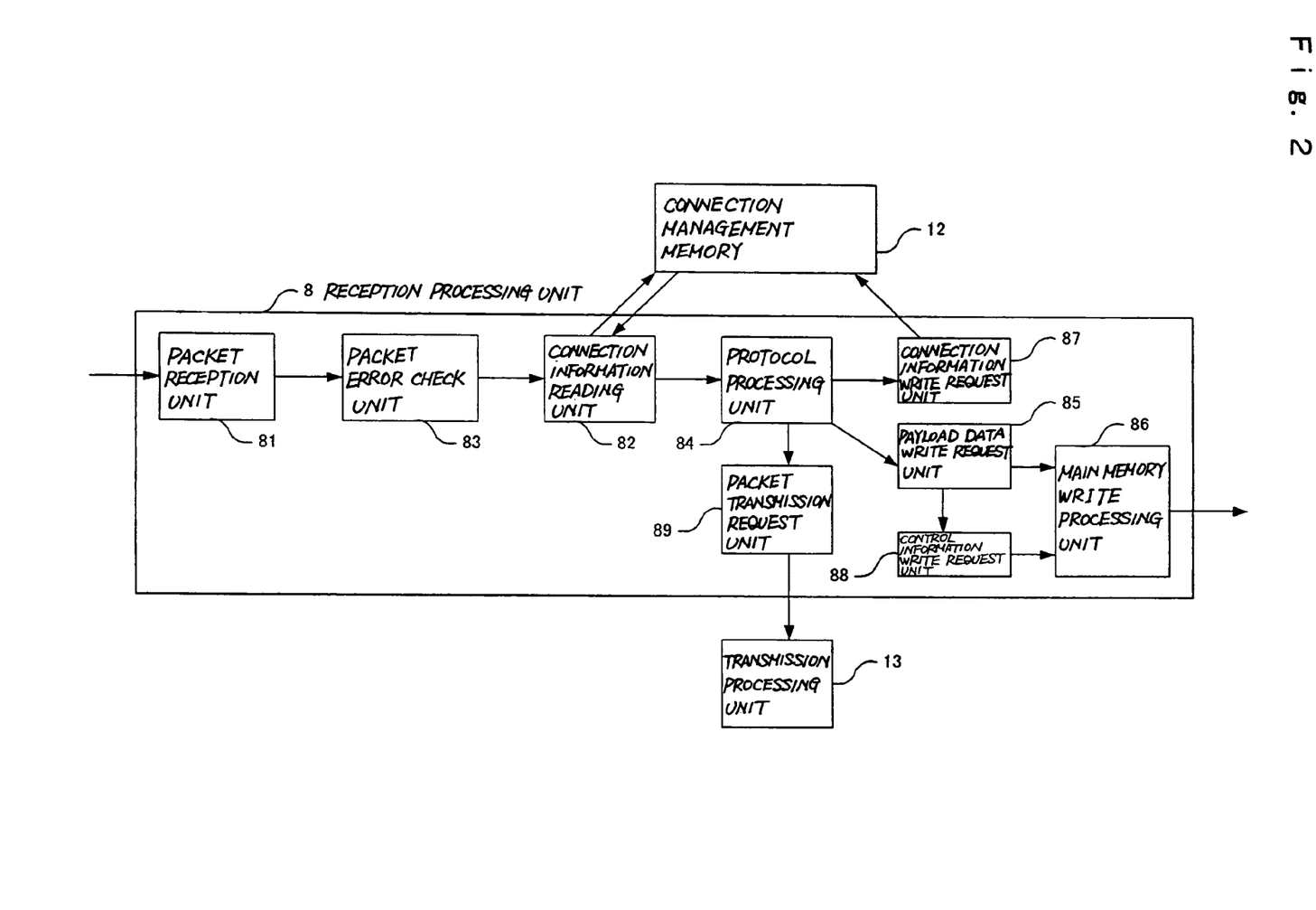
FIG. 2 is a block diagram illustrating the configuration of a reception processing unit in a conventional RDMA communications apparatus.

FIG. 2 illustrates an exemplary configuration of conventional reception processing unit 8 in RDMA communications apparatus 9. Conventional reception processing unit 8 comprises packet reception processing unit 81, packet error check unit 83, connection information reading unit 82, protocol processing unit 84, connection information write request unit 87, packet transmission request unit 89, payload data write request unit 85, control information write request unit 88, and main memory write processing unit 86.

Upon receipt of a packet from RDMA communications apparatus 9 on the transmission side, packet reception processing unit 81 determines the type of protocol from a header section in the packet, and then requests packet error check unit 83 to check whether or not any error exists in the packet. Packet error check unit 83 checks whether any data error exists in the overall packet or in the payload section of the packet. Specifically, the error check processing refers to an FCS calculation when the Ethernet (registered trademark) is utilized on Layer 2, or a TCP check sum calculation when TCP is utilized on Layer 4. When any error is found in the packet, the packet is discarded and is not subjected to subsequent processing.

When no error is found in the packet after the packet has been tested up to the end thereof, connection information reading unit 82 reads connection information from connection management memory 12 based on a connection identifier for uniquely identifying a connection which can be extracted from the header section in the packet. Upon completion of the reading of the connection information, protocol processing unit 84 performs protocol processing based on the read connection information and the payload information of the received packet. Specifically, the protocol processing involves processing for determining from which address payload data is written into application memory area 31, processing for determining the contents of connection information which should be updated, processing for determining whether or not a response packet must be sent, and generating information on the response packet if it must be sent, and processing for determining whether or not control information must be written into control information memory area 32 and determining contents of the control information if needed. A typical example of the response packet is an ACK (ACKnowledgement) packet of TCP.

At the time protocol processing unit 84 determines a location in which payload data is written, payload data write request unit 85 writes the payload data into application memory area 31 through main memory write processing unit 86. Connection information write request unit 87 writes connection information updated by protocol processing unit 84 into connection management memory 12. Packet transmission request unit 89 requests transmission processing unit 13 to send a response packet when protocol processing unit 84 determines that the response packet must be sent. Control information write request unit 88 writes control information into control information memory area 32 through main memory write processing unit 86 after the payload data has been completely written, when protocol processing unit 84 determines that the control information must be written.

A typical example of control information in the RDMA communication is a read complete notice which is generated when an RDMA read has been controlled. In the RDMA communication, at the time transfer data has been fully transferred from application memory area 31 of RDMA communications apparatus 9 on the transmission side to application memory area 31 of RDMA communications apparatus 9 on the reception side, control information is written to indicate that RDMA read control has been completed, thereby notifying processor 2 of the completion of an RDMA read. The total capacity of transfer data transferred in one RDMA communication is often larger than the payload length of a packet, in which case the RDMA communication is made by dividing the transfer data into a plurality of payloads in a plurality of packets. The control information is written to provide notification that the RDMA read control has been completed after all packets for RDMA transfer have been completely received to complete the transfer of the payload data to application memory area 31.

Figure 3:
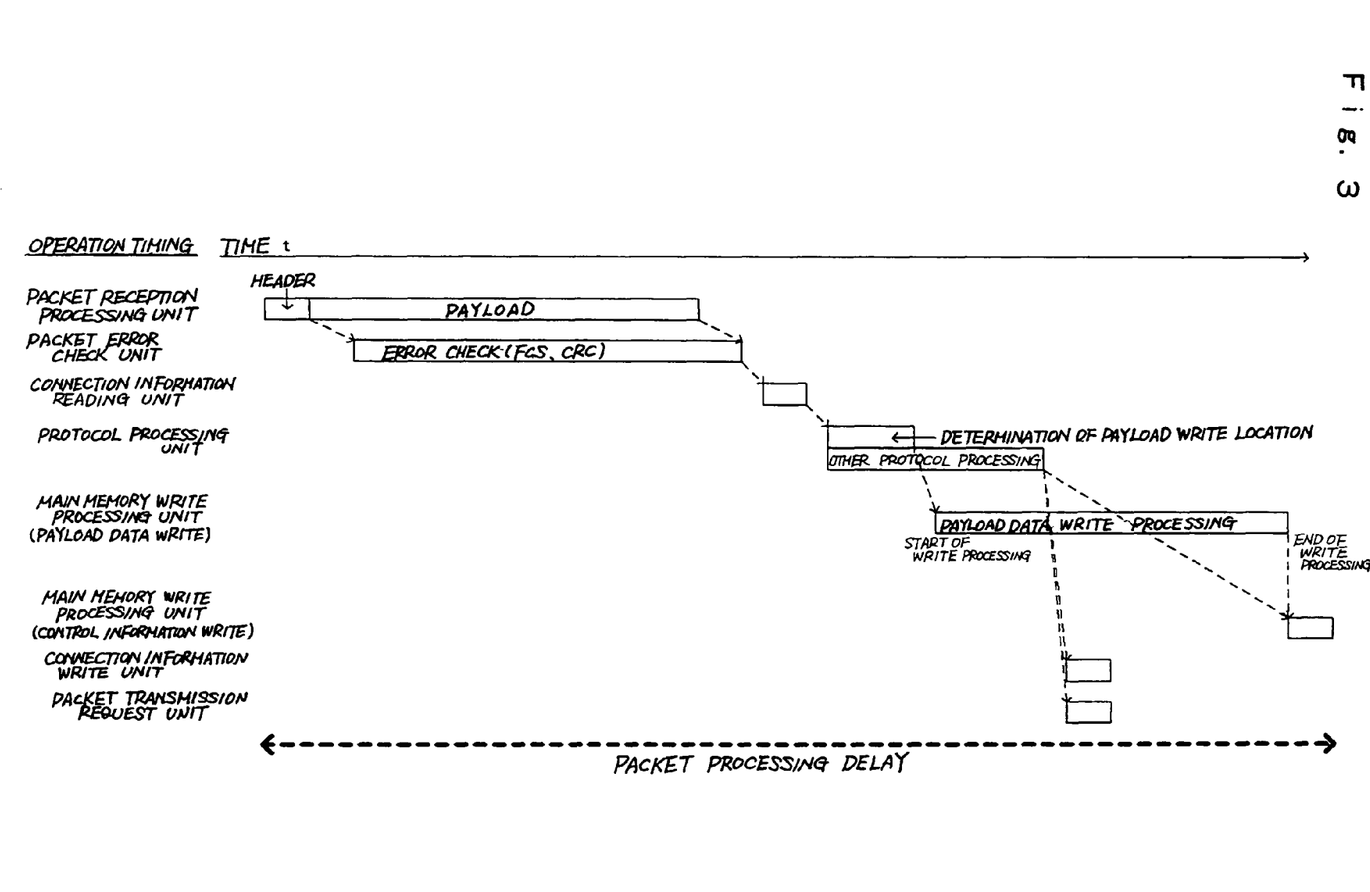
FIG. 3 is a timing chart representing reception control in the conventional RDMA communications apparatus.

Next, a conventional reception operation in RDMA communications apparatus 9 will be described with reference to a timing chart of FIG. 3.

Upon receipt of a packet from RDMA communications apparatus 9 on the transmission side, packet reception processing unit 81 receives a header section, and requests packet error check unit 83 for appropriate processing at the time the type of protocol is determined. Packet error check unit 83 checks the overall packet or the overall payload data in the packet to determine whether or not the packet is defective. The packet must have been received up to its end before packet error check unit 83 completes the determination as to whether or not any error exists in the packet. Upon completion of the error check in packet error check unit 83, connection information reading unit 82 reads connection information which is then passed to protocol processing unit 84. At the time protocol processing unit 84 determines a location in which the payload is written based on the header information of the packet and the connection information, the payload data is written in main memory write processing unit 86. Upon completion of other protocol processing in protocol processing unit 84, connection information write request unit 87 and packet transmission request unit 89 execute their respective processing. The control information is written in main memory write processing unit 86 after the completion of both the other protocol processing in protocol processing unit 84 and the writing of the payload data in main memory write processing unit 86.

JP-A-2004-7254 also describes a communications apparatus which has a function of directly writing payload data included in a received packet into a buffer of an application program. However, the communications apparatus described in JP-A-2004-7354 employs a Layer-4 protocol which is defined exclusively for RDMA communications.

On the other hand, another prior art technique related to communications involves switching between a data transfer which is associated with an error check and a data transfer which omits the error check in accordance with a remaining amount of capacity in a reception buffer, as shown in JP-A-1997-149067. A further prior art technique starts writing a packet into a memory without waiting for the completion of an error check of the packet, and upon detection of an error, discards the data that has been written up to this point which includes the error, as shown in JP-A-1998-341419.

As described above, the conventional RDMA communications apparatuses check whether or not any error exists in a received packet, and then write a payload data into an application buffer after they have found that no error exists in the packet. While representative examples of checking whether or not errors exist in a packet are FCS and CRC, packet data must be received up to the end thereof in order to calculate FCS or CRC to check whether or not there is any error in the packet. Generally, a packet size of 1500 bytes is employed in the Ethernet (registered trademark) which is used as standard in the Internet. Accordingly, an RDMA communications apparatus on the reception side cannot write payload data into an application buffer unless it has fully received 1500 bytes of packet data and confirms that there is no error in the packet. Of course, when a communication is made in a larger packet size with the intention of increasing a transfer efficiency, an even longer waiting time is involved to confirm whether or not there are errors in the packet.

As described above, the conventional RDMA communications apparatuses are faced with the challenge of a large delay which is experienced by RDMA communications apparatus 9 on the reception side, from the time that packet is received until the time that the a packet is written of the packet into an application buffer. This is because, as described above, RDMA communications apparatus 9 on the reception side performs an operation for reading connection information, for processing of protocol represented by the determination of a location in which payload data is written, and for processing of writing the payload data into the application buffer after RDMA communications apparatus 9 has received a full packet and confirmed that there is no error in the packet.

To solve such a problem, it is thought that the technique described in JP-A-1998-341419 can be applied to the RDMA communication to start writing a received packet into an application memory without waiting for the completion of an error check for the packet, and upon detection of an error, to discard all data including the error that has been written into application memory up to this point. However, when a communication protocol such as TCP is utilized in Layer 4, an area in which a payload of a re-transmitted packet is to be stored, can partially or entirely overlap with an area in which a payload of a packet received in the past has already been stored. For this reason, if payload data is written before an error check, the payload data can overwrite valid data within application memory area 31, so that a simple discard of an erroneous packet could cause a valid section on application memory area 31 to be passed to an application while it remains corrupted by the error packet. Of course, no problem will arise if Layer 4 protocol, defined exclusively for the RDMA communications, is utilized as found in JP-A-2004-7354 to ensure that a payload of a received packet will be stored in an area which does not overlap with any area which has stored a payload of a packet received in the past. However, since the employment of TCP/IP, utilized as a standard in the Internet, enables a reduction in the price of RDMA communications apparatuses, and enables coexistence with other communication protocols and applications, the implementation of TCP/IP based RDMA communications, i.e., RDMA over TCP/IP, is important.

SUMMARY OF THE INVENTION

It is an object of the present invention to reduce a delay in an RDMA communications apparatus on the reception side from the time the apparatus receives a packet to the time that it writes the packet into an application buffer, and to prevent corrupted data from being passed to an application program even with the employment of Layer 4 protocol which can cause a payload of a re-transmitted packet to be stored in an area which partially or entirely overlaps with an area which has stored a payload of a packet received in the past.

A first communications apparatus of the present invention is adapted to directly transfer payload data included in a received packet to an application memory area, and comprises an error check unit for checking the payload data for an error, a write processing unit for performing write processing to write the payload data into the application memory area, and a protocol processing unit for causing the write processing unit to start the write processing to write the payload data into the application memory without waiting for the completion of the error check, and for returning a valid section in the application area overwritten by the write processing to an invalid section which has not stored normal data upon detection of an error.

A second communications apparatus of the present invention is adapted to directly transfer payload data included in a received packet to an application memory area, and comprises an error check unit for checking the payload data for an error, a write processing unit for performing write processing to write the payload data into the application memory area, and a protocol processing unit for causing the write processing unit to start the write processing to write the payload data into the application memory without waiting for the completion of the error check to the extent that a valid section in the application memory area is not overwritten by the payload data.

In the present invention, a delay associated with packet processing is reduced by writing payload data in a received packet into the application memory area in parallel with a check of the payload data for errors. When an error is detected, corrupted data is prevented from being passed to an application program by returning a valid section in the application memory area which is overwritten by the write processing to an invalid section which has not stored normal data, or by writing the payload data into the application memory area to the extent that a valid section in the application memory area is not overwritten by the payload data.

The above and other objects, features, and advantages of the present invention will become apparent from the following description with reference to the accompanying drawings, which illustrate examples of the present invention.

DETAILED DESCRIPTION OF THE PREFERRED EMBODIMENTS

First Embodiment

RDMA communications apparatus 9 of the present invention generally comprises network adaptor 1, processor 2, main memory 3, I/O device 4, and system bus 5 which interconnects these components, like the configuration of conventional RDMA communications apparatus 9, as illustrated in FIG. 1. Main memory 3 has two memory areas, i.e., application memory area 31 which is a memory area for an application to perform processing, and control information memory area 32 which is a memory area for a communication protocol to manage control information. Network adaptor 1 comprises reception processing unit 8, transmission processing unit 13, and connection management memory 12. The RDMA communications apparatus of the present invention differs from conventional RDMA communications apparatus 9 in the configuration of reception processing unit 8.

Figure 4:
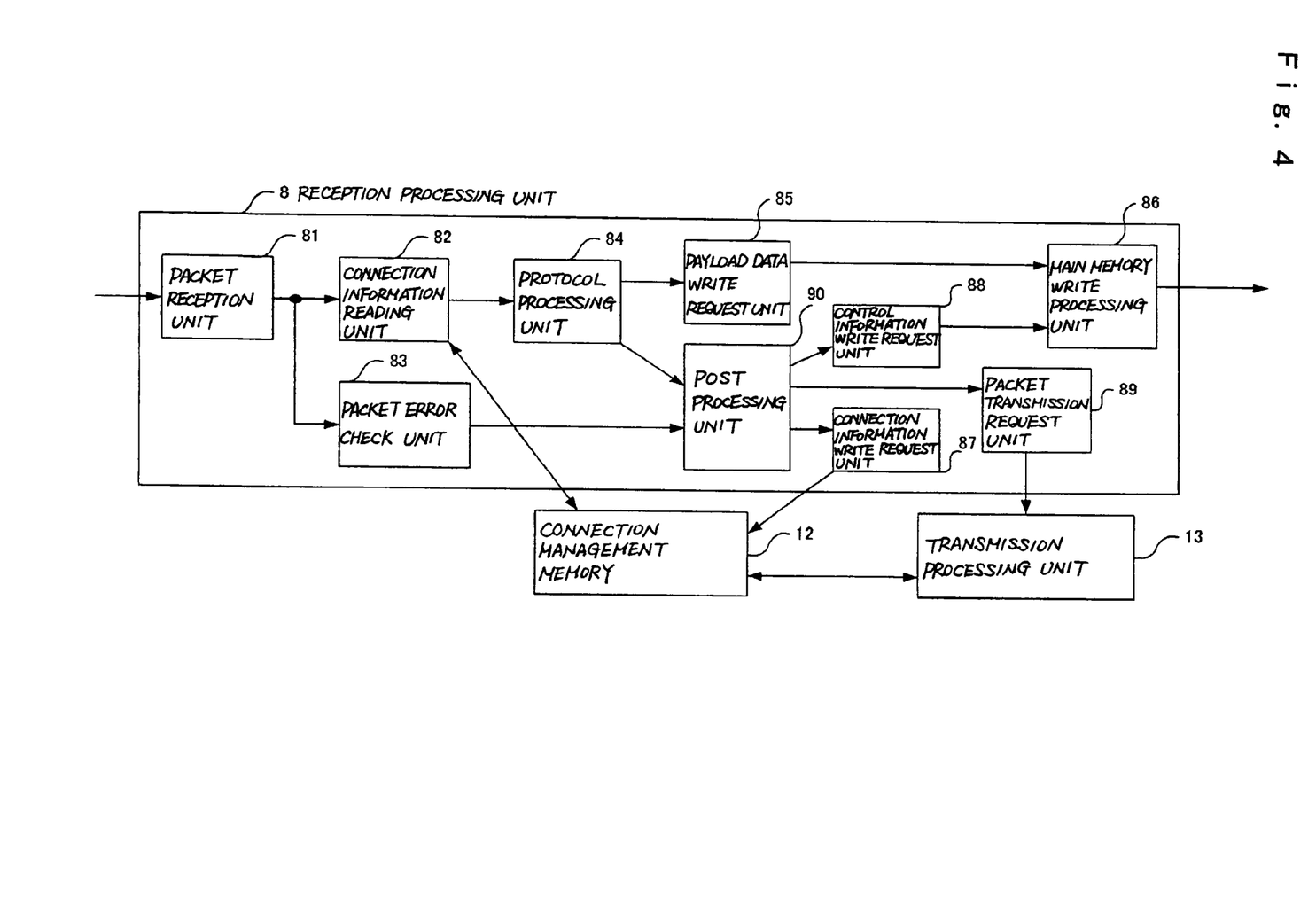
FIG. 4 is a block diagram illustrating an exemplary configuration of a reception processing unit within RDMA communications apparatuses according to a first, a fourth, and an eighth embodiment of the present invention.

Referring to FIG. 4, reception processing unit 8 in RDMA communications apparatus 9 according to a first embodiment of the present invention comprises packet reception processing unit 81, connection information reading unit 82, protocol processing unit 84, packet error check unit 83, payload data write request unit 85, post-processing unit 90, control information write request unit 88, connection information write request unit 87, main memory write processing unit 86, and packet transmission request unit 89.

A packet received from RDMA communications apparatus 9 on the transmission side is supplied to packet processing unit 81 of reception processing unit 8 in RDMA communications apparatus 9 on the reception side. Packet reception processing unit 81 identifies the type of the packet and a connection based on header information in the received packet. As the connection is identified by packet reception processing unit 81, information required to process the connection is read from connection management memory 12 in connection information reading unit 82. Simultaneously, packet error check unit 83 checks the received packet as to whether or not any error is included therein.

When connection information reading unit 82 has read the connection information, protocol processing unit 84 performs protocol processing based on the header information in the received packet and the connection information, determines from which address a payload of the received packet should be written into application memory area 31, and requests payload data write request unit 85 to write payload data into memory area 31. Protocol processing unit 84 in turn calculates contents of updated connection information, information on a response packet which is sent as a response to the received packet as required, and control information which is written into control information memory area 32 as required, on the assumption that there is no error in the received packet. Protocol processing unit 84 also calculates contents of updated connection information, information on a response packet which is sent as required, and control information which is written into control information memory area 32 as required.

Upon receipt of a payload write request from payload data write request unit 85, main memory write processing unit 86 writes payload data into application memory area 31 from a specified address. This write processing is executed irrespective of the result of processing by packet error check unit 83. Therefore, the payload data can be written into application memory area 31 with a small delay after reception of the packet.

Post-processing unit 90 receives post-processing information from protocol processing unit 84 for two cases: when any error is found in the received packet, and when no error is found in the received packet. Specifically, the post-processing information includes connection information for updating connection management memory 12, packet information on a packet which is sent for a response, and control information which is written into control information memory area 32. It should be noted that the connection information for updating connection management memory 12 also includes information indicating that the connection information is not updated. Likewise, packet information on a packet sent for a response includes information indicating that no response packet is sent. Control information written into control information memory area 32 also includes information indicating that no control information is written.

Post-processing unit 90 starts post-processing after it has received the post-processing information and the result of the error check processing performed by packet error check unit 83. Specifically, from two options of post-processing information, one option associated with a received packet that includes any error, and the other option associated with a received packet that includes no error, post-processing unit 90 selects the former when the result of error check processing indicates the absence of error, and selects the latter when the result indicates the presence of error. Then, post-processing unit 90 executes one of three processing options in accordance with the selected post-processing information: processing to request connection management memory 12 to update connection information, processing to request packet transmission request unit 89 to send a response packet, and processing to request control information write request unit 88 to write control information into control information memory area 32. In this event, when the connection information must be updated, post-processing unit 90 updates the connection information in connection management memory 12 through connection information write request unit 87. Also, when a response packet must be sent, post-processing unit 90 requests that the response packet be sent through packet transmission request unit 89. Also, when control information must be written, post-processing unit 90 requests main memory write processing unit 86 to write the control information through control information write request unit 88. Main memory write processing unit 86 writes the control information into control information memory area 32 in response to the request from control information write request unit 88. When payload data of a received packet corresponding to the control information to be written has not been completely written into application memory area 31, main memory write processing unit 86 must wait for the completion of the write processing before it writes the control information.

In this connection, post-processing unit 90 requests packet transmission request unit 89 to send a response packet in accordance with the result of the error check in packet error check unit 83, however, when the same response packet is sent irrespective of the result of the error check in packet error check unit 83, post-processing unit 90 may request packet transmission request unit 89 to send the response packet without waiting for the result of the error check. Also, post-processing unit 90 requests connection information write request unit 87 to update connection information in accordance with the result of the error check in packet error check unit 83, but when some or all of the connection information is updated so that the content is same as irrespective of the result of the error check, post-processing unit 90 may send an update request to connection information write request unit 87 without waiting for the result of the error check.

Next, the operation of RDMA communications apparatus 9 according to the first embodiment will be described with reference to the timing chart of reception control unit 8 in FIG. 5.

To process a received packet, packet reception processing unit 81 requests packet error check unit 83 and connection information reading unit 82 for respective processing upon receipt of the header section of the packet. When protocol processing unit 84 determines a location in which the payload is written after connection information reading unit 82 has read header information, main memory write processing unit 86 starts writing the payload data in response to a request from payload data write request unit 85. Also, when protocol processing unit 84 has completed the remaining protocol processing, and packet error check unit 83 has completed the error check up to the end of the packet, post-processing unit 90 selects appropriate processing to be executed in accordance with whether or not any error has been found. Depending on the selected processing, connection information write request unit 87 updates the connection information, while packet transmission request unit 89 is requested to send a response packet, as required. Main memory write processing unit 86 writes the control information after post-processing unit 90 has selected the processing to be executed, and after main memory write processing unit 86 has written the payload data.

In this way, it is possible to reduce a packet processing delay as a whole by immediately executing a process to read a sequence of the connection information, to determine the payload write location in protocol processing unit 84, and to write payload data in main memory write processing unit 86 without waiting for the result of the error check in packet error check unit 83.

EXAMPLE OF DETAILED OPERATION

Next, an example of the detailed operation of RDMA communications apparatus 9 according to the first embodiment will be described with reference to FIGS. 6 to 8. Assume, in the following examples of operation, that TCP is used as the Layer 4 protocol for RDMA communications apparatus 9.

First Example of Detailed Operation

Figure 6:
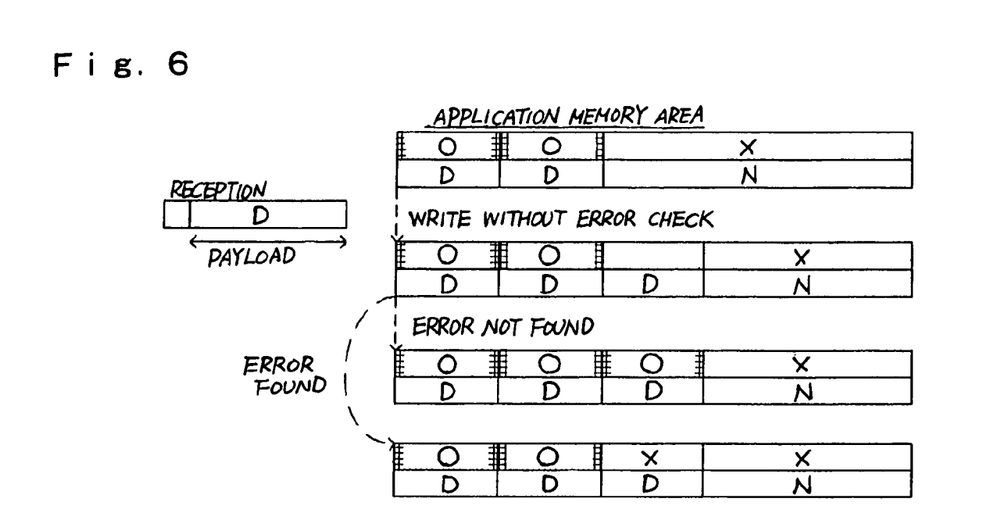
FIG. 6 is a diagram showing an example of changes in the managed content in an application memory area during reception of a packet in the RDMA communications apparatus of the present invention.

FIG. 6 shows a first example of changes in managed contents of application memory area 31 during reception of a packet in RDMA communications apparatus 9 according to the present invention.

Data 1 and Data 2 have been written in Valid Section 1 and Valid Section 2, respectively, in application memory area 31. The rest of application memory area 31, which does not store received data, is regarded as an invalid section. The valid section refers to a managed memory area which is regarded as validly storing received data within application memory area 31, and a data area which is scheduled to be notified as normal data to processor 2 upon completion of an RDMA communication. On the other hand, the invalid section refers to a memory area which has not stored valid data in application memory area 31, and must store normally received data from RDMA communications apparatus 9 on the transmission side. In this connection, the valid section and invalid section are sections for network adaptor 1 to manage received data. As such, processor 2 does not reference whether a memory area is valid or invalid before the completion of RDMA communication to start the processing for a valid section. Processor 2 accesses a final valid section only after network adaptor 1 has notified processor 2 of the completion of RDMA communication through control information memory area 32, subsequent to the completed reception of overall transfer data in the RDMA communication. With this feature, network adaptor 1 can overwrite a data area, which has been once set to a valid section, to return to an invalid section.

While FIG. 6 describes, for facilitating the understanding of the description, that Valid Section 1 and Valid Section 2 are managed as separate sections corresponding to Data 1 and Data 2, respectively, such two or more continuous sections may be managed as a single continuous valid section.

In the aforementioned state, assume that RDMA communications apparatus 9 on the reception side receives a packet which contains Data 3 in payload data from RDMA communications apparatus 9 on the transmission side. Here, assuming that Data 3 follows immediately after Data 2, RDMA communications apparatus 9 on the reception side writes this Data 3 into application memory area 31 before a check is completed as to whether or not there is any error in the received packet. Subsequently, after the error check has been completed for the received packet to find that there is no error, written Date 3 is managed as valid data, and RDMA communications apparatus 9 on the transmission side is notified through a response packet that Data 3 has been received.

On the other hand, when any error is found in the received packet, RDMA communications apparatus 9 on the reception side manages written Data 3 as invalid section. If RDMA communications apparatus 9 on the reception side does not simply send a response packet, RDMA communications apparatus 9 on the transmission side determines that the packet has been discarded, and re-transmits a packet with a payload which contains Data 3. Receiving the packet again with the payload containing Data 3, RDMA communications apparatus 9 on the reception side performs processing similar, to that during the first time. RDMA communications apparatus 9 on the reception side manages a data portion as a valid section when no error is found in the packet of payload containing Data 3 which has been received again. After all transferred data in the RDMA communication has been eventually written into valid sections, control information memory area 32 is notified of the completion of the data reception, and processor 2 in RDMA communications apparatus 9 recognizes that the data has been received.

In the first embodiment, when any error is found in the first received packet with a payload which contains Data 3, RDMA communications apparatus 9 on the transmission side re-transmits the packet with the payload which contains Data 3 in response to the absence of a response packet returned thereto. Additionally, a technique can be considered which prompts RDMA communications apparatus 9 on the transmission side to re-transmit the packet with the payload which contains Data 3 at an earlier timing by intentionally returning a response packet which indicates that Data 2 has been received.

Second Example of Detailed Operation

Figure 7:
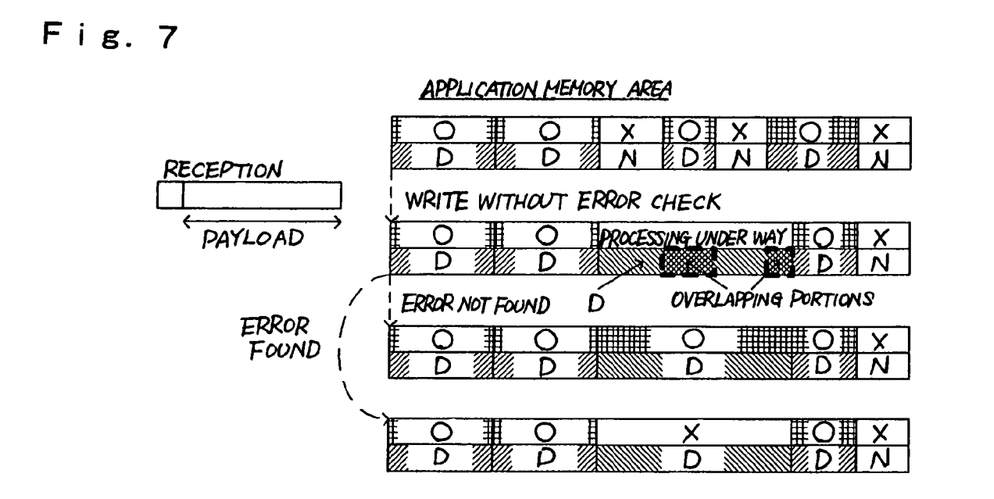
FIG. 7 is a diagram showing another example of changes in managed content in an application memory area during reception of a packet in the RDMA communications apparatus of the present invention.

FIG. 7 shows a second example of changes in the managed contents of application memory area 31 during reception of a packet in RDMA communications apparatus 9 according to the first embodiment.

Assume that application memory area 31 has stored Data 1, Data 2, Data 3, and Data 4 as Valid Sections 1, 2, 3, 4, respectively, at the first stage. While Data 1 and Data 2 are stored in a continuous area, invalid sections intervene between Data 2 and Data 3 and between Data 3 and Data 4. In FIG. 7 "○" means a valid section; "x" an invalid section; "D" data; and "N" not received. Such fragmental valid sections are mainly caused by a packet loss.

Assume that RDMA communications apparatus 9 has received a re-transmitted packet which has a payload of Data 5. Assume also that Data 5 includes an area from the end of Data 2 to Data 3, and occupies a data area which extends halfway into Data 4. Upon receipt of the packet with payload of Data 5, RDMA communications apparatus 9 on the reception side writes Data 5 into application memory area 31 before confirming whether or not any error exists in the packet. In writing Data 5, a portion of previous valid data, i.e., all Data 3 and part of Data 4 from the beginning, is overwritten by Data 5.

When an error check has been completed for the packet of Data 5 to find that there is no error in the packet, the memory area into which Data 5 has been written is newly set to a valid section. This results in a continuous valid section extending from Data 1 to the end of Data 4. Consequently, a response packet is sent to RDMA communications apparatus 9 on the transmission side together with an ACK sequence number, indicating that Data 4 has been received from beginning to end, as an ACK packet of TCP.

On the other hand, when any error is found in the packet of Data 5, a portion into which Data 5 has been written is newly defined as an invalid section. This results in a change to invalid sections of an originally valid section (Valid section 3) in which Data 3 has been stored, and a leading portion of Valid Section 4 in which Data 4 has been stored. Protocol processing unit 84 in reception control unit 8 of RDMA communications apparatus 9 on the reception side has a function of executing protocol processing to maintain the consistency when any error is found in a received packet, other than the normal protocol processing which is performed when no error is found in a received packet.

A specific example of protocol processing to maintain the consistency against errors found in a received packet may be to generate data for managing a portion of a memory area into which payload data of an erroneous packet has been written as an invalid section. When Layer 4 is a TCP protocol and does not utilize an SACK option (RFC2018), erroneous Data 5 may be managed as an invalid section, and a correct ACK packet may be sent to indicate the end of a continuous valid section which does not include invalid sections. In response, RDMA communications apparatus 9 on the transmission side will re-transmit a packet associated with the portion which is newly defined as an invalid section, so that a normal packet can be eventually received.

Also, when an employed Layer 4 protocol provides a TCP SACK option which notifies what is a valid section and what is an invalid section, another specific example of the protocol processing to maintain the consistency against errors found in a received packet may be to notify RDMA communications apparatus 9 on the transmission side, through an ACK response packet, of changes in valid sections and invalid sections resulting from discarding of an erroneous packet.

Figure 8:
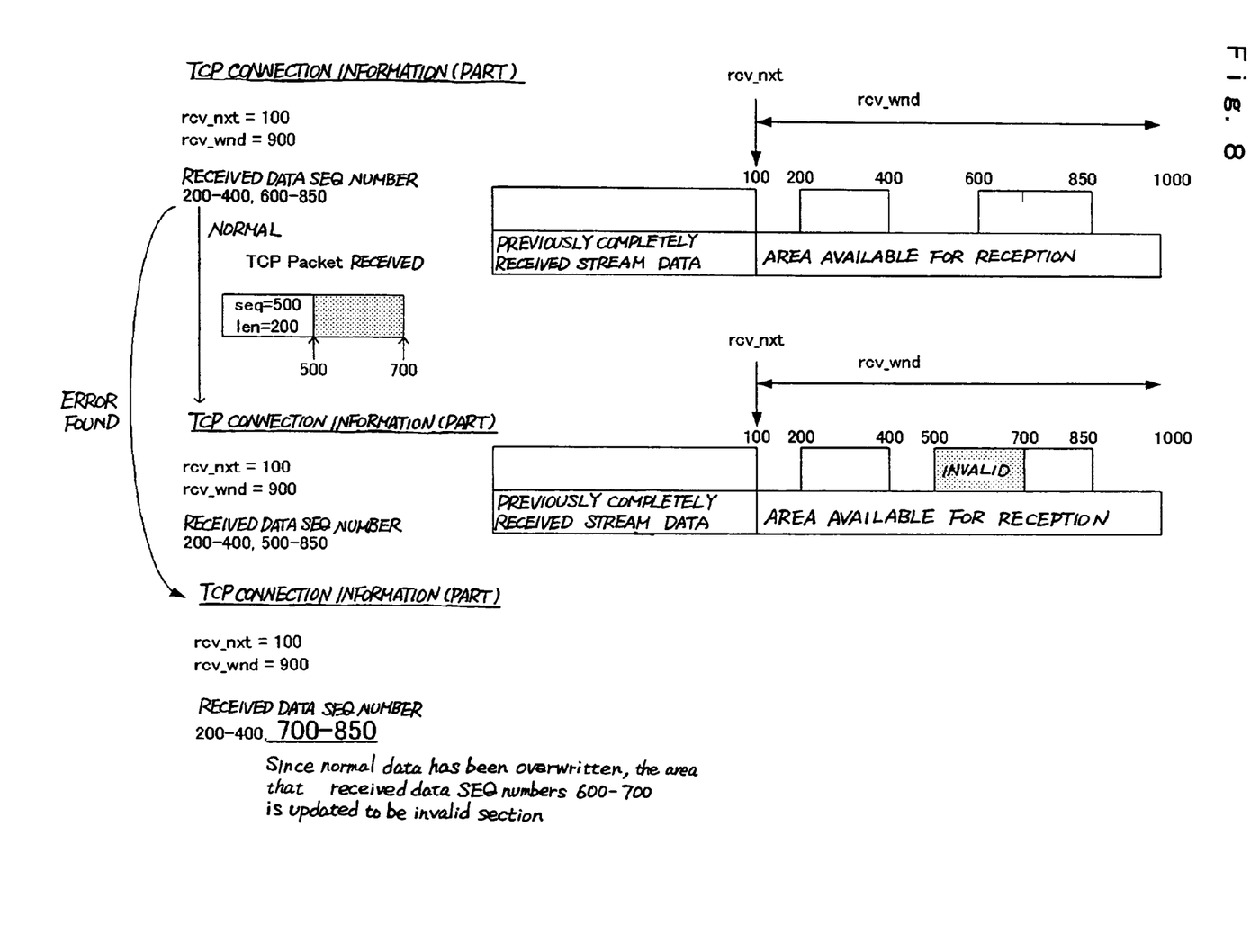
FIG. 8 is a diagram showing a further example of changes in managed content in an application memory area during reception of a packet in the RDMA communications apparatus of the present invention.

Referring next to FIG. 8, a description will be given of connection information for managing valid sections and invalid sections of data written into application memory area 31. In the example of FIG. 8, three types of data, rcv_nxt, rcv_wnd, and a received data SEQ number are used to manage valid sections and invalid sections of data. Here, rcv_nxt indicates data which is being correctly received in sequence, as represented by a data SEQ number, rcv_wnd indicates a valid reception area as represented by a data SEQ number from rcv_nxt, and the received data SEQ number indicates the range of correctly received data within rcv_wnd, as represented by a data SEQ number. For example, in a state shown in the upper stage of FIG. 8, data has been correctly received up to SEQ number 100, and a remaining valid reception range is calculated as 1000−100=900, in which data with SEQ numbers from 200 to 400 and from 600 to 850 have been correctly received, thus resulting in rcv_nxt=100, rcv_wnd=900, and received data SEQ numbers=200-400, 600-850.

Assuming that in this state, a re-transmitted packet is received with a start SEQ number=500 and length=200 (SEQ number) being set in a header, and assuming that the packet includes an error, the range of SEQ numbers from 500 to 700, which has been overwritten by the payload of the packet, becomes an invalid section, as shown in the lower stage of FIG. 8, with the result that the received data sequence numbers are changed from 200-400, 600-850 to 200-400, 700-850, respectively, in the connection information. For reference, if the re-transmitted packet does not include any error, the received data SEQ numbers changes to 200-400, 500-850.

Next, a description will be given of advantages of the first embodiment.

Figure 5:
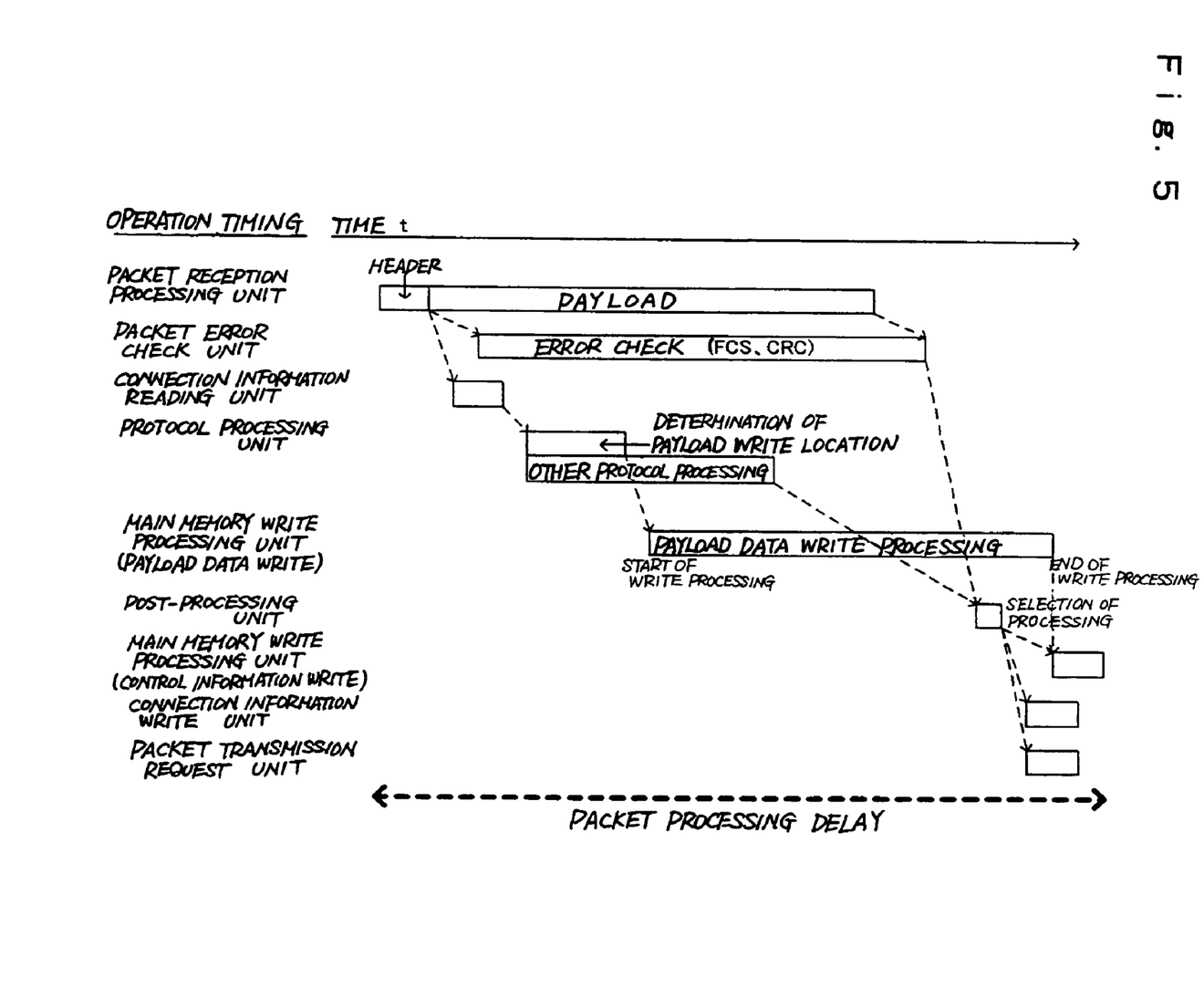
FIG. 5 is a timing chart representing reception control in the first embodiment of the present invention.

According to the first embodiment, since payload data is immediately written by main memory write processing unit 86 without waiting for the result of an error check in packet error check unit 83, a packet processing delay can be reduced as a whole, as shown in the timing chart of FIG. 5.

Also, according to the first embodiment, when any error is detected in a packet, not only payload data of the packet is made invalid, but also part of data that previously and normally received but overwritten by the payload data is reset to an invalid state, thus making it possible to avoid corrupted data from being passed to an application program.

Further, according to the first embodiment, when an employed Layer 4 protocol provides a TCP SACK option that indicates which section is valid and which section is invalid, RDMA communications apparatus 9 on the transmission side is notified, through an ACK response packet, of changes in valid sections and invalid sections resulting from discarding of an erroneous packet, thereby allowing the transmission side to recognize that a memory area, once notified as a valid section, is subsequently changed to an invalid section.

Second Embodiment

In the first embodiment, all payload data is written into the application memory area without waiting for the result of an error check, whereas in a second embodiment to a sixth embodiment, later described, payload data is written to the extent that no valid section is overwritten.

Figure 9:
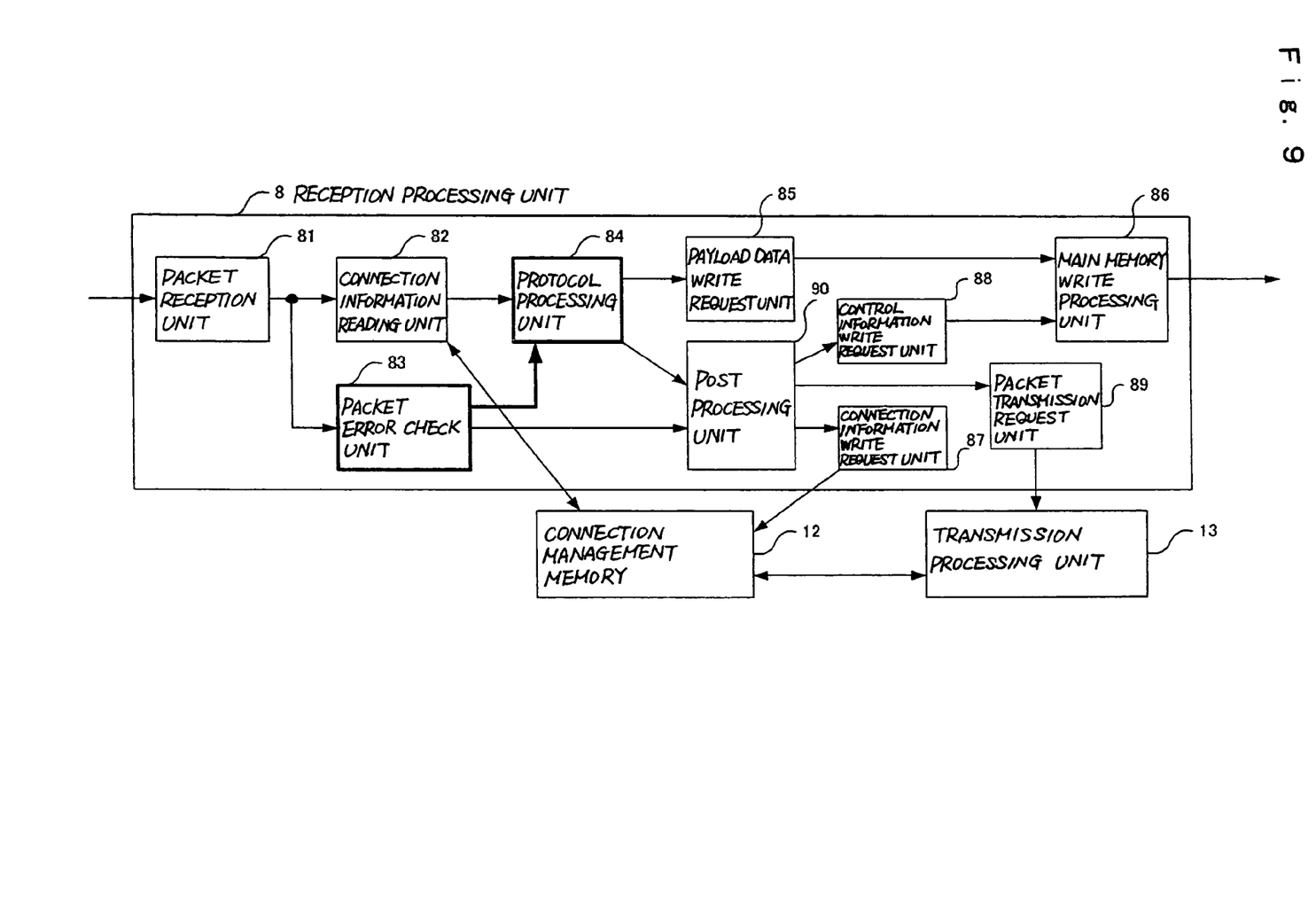
FIG. 9 is a block diagram illustrating an exemplary configuration of a reception processing unit within RDMA communications apparatuses according to a second, a third, a fifth and a sixth embodiment of the present invention.

Referring to FIG. 9, reception processing unit 8 of RDMA communications apparatus 9 according to the second embodiment of the present invention is configured such that packet error check unit 83 notifies protocol processing unit 84 of the result of an error check. Protocol processing unit 84 requests payload data write request unit 85 to write payload data without waiting for the result of processing by packet error check unit 83 only when all valid sections are continuous as shown in FIG. 6, and when no invalid section intervenes between the respective valid sections. On the other hand, when an invalid section intervenes between valid sections as shown in FIG. 7, protocol processing unit 84 waits for the result of an error check in packet error check unit 83, and then requests that payload data be written only when no error is found. Stated another way, the second embodiment perceives that according to TCP specifications RFC793, when valid sections are continuous, it is ensured that payload data written into application memory 31 will not overlap with existing valid sections. The rest of the configuration and operation in the second embodiment is the same as the first embodiment.

Next, a description will be given of advantages of the second embodiment.

According to the second embodiment, protocol processing unit 84 requests that payload data be written before an error check is completed in packet error check unit 83 under the limited condition that valid sections are continuous, so that post-processing is advantageously simplified when executed in post-processing unit 90. Specifically, since it is ensured that payload data to be written does not overlap with existing valid sections, post-processing required when any error is found in a packet may omit the delivery of a response packet and the updating of the connection information, simply on the assumption that no packet has been received. This results in elimination of the need for dedicated consistency processing associated with a change of existing data from a valid section to an invalid section when any error is found, as in the first embodiment, thus leading to simpler processing.

Also, according to the second embodiment, when a response packet generated by RDMA communications apparatus 9 on the reception side utilizes a protocol which notifies RDMA communications apparatus 9 on the transmission side of valid sections and invalid sections which must be kept consistent, i.e., when a memory area once determined as a valid section cannot be determined as an invalid section at a later time, the present invention can also be applied to such a scenario.

When packets are hardly discarded between two RDMA communications apparatuses 9 in a stable network, it is contemplated that valid sections are continuous in most scenarios with the intervention of few invalid sections between the valid sections. Accordingly, when an invalid section intervenes between valid sections, payload data is written before packet error check unit 83 completes an error check, resulting in a failure to provide the advantage of reducing communication delay. In this regard, however, it is contemplated that the system will not be significantly affected as a whole.

Also, a scenario in which invalid sections intervene between valid sections is attributable to an unstable network and is more likely to involve retransmissions. Since the overall system is significantly more affected by an increased communication delay time due to packet retransmissions than by a reduced delay time resulting from writing of payload data before the completion of an error check, it is contemplated that the system will hardly be affected by a failure to write payload data before the completion of the error check in a scenario in which invalid sections intervene between valid sections.

Third Embodiment

Reception processing unit 8 of RDMA communications apparatus 9 according to a third embodiment comprises the configuration illustrated in FIG. 9, just like reception processing unit 8 of RDMA communications apparatus 9 according to the second embodiment. The third embodiment is the same as the second embodiment in that packet error check unit 83 notifies protocol processing unit 84 of the result of an error check, but differs in that protocol processing unit 84 of the third embodiment determines a payload data write location by checking whether or not any part of data to be written into application memory area 31 overlaps with existing valid sections, and requests payload data write request unit 85 to write the payload data without waiting for the result of the error check in packet error check unit 83 when any part of the data does not overlap with the valid sections, while waiting for the result of the error check in packet error check unit 83 and requests payload data write request unit 85 to write the payload data after confirming that no error has been found when the data overlaps with the valid sections. The rest of the configuration and operation is the same as in the second embodiment.

Next, a description will be given of advantages of the third embodiment.

According to the third embodiment, when payload data is written before completion of the error check, it is ensured that existing valid sections are not overwritten by the payload data, so that post-processing, required when any error is found in a packet, is advantageously simplified when executed in post-processing unit 90, as is the case with the second embodiment.

Also, in the third embodiment, even if invalid sections intervene between valid sections, writing of payload data into memory is started without waiting for the completion of an error check on the condition that the newly written payload data does not overlap with valid sections, so that a communication delay is advantageously reduced even in a scenario where communication delay cannot be reduced in the second embodiment.

It should be noted that payload data requested by protocol processing unit 84 to payload data write request unit 85 is not always an overall payload of a received packet, but depends on a utilized Layer 4 protocol. For example, in the case of TCP, if a leading portion of a payload in a received packet overlaps with an existing valid section, the existing valid section is given a higher priority, so that the overlapping leading portion of the received packet is removed before requesting payload data write processing. On the other hand, when a data portion of a received packet starting from the rear side of a leading portion of the same packet overlaps a valid section, the received packet is given a higher priority, so that the existing valid section is overwritten by the payload data. As a specific example, when a re-transmitted packet is received with SEQ number=300 and length=400 set in the header, for example, in the scenario shown in the upper stage of FIG. 8, a portion of SEQ numbers 300-400 is not overwritten, but a portion of SEQ numbers 600-700 is overwritten.

Fourth Embodiment

Reception processing unit 8 of RDMA communications apparatus 9 according to a fourth embodiment comprises the configuration illustrated in FIG. 4, just like reception processing unit 8 of RDMA communications apparatus 9 according to the first embodiment. Then, as compared with the first embodiment, the fourth embodiment differs from the first embodiment in that protocol processing unit 84 compares a received packet with valid sections in application memory area 31 when it requests payload data write request unit 85 to write the received packet, and requests payload write request unit 85 to write only non-overlapping data portions before the completion of an error check, if the data overlaps with any valid section, on the premise that preference is given to all the valid sections existing in application memory area 31. Here, requested data can be continuous or discontinuous. When requested data is discontinuous, payload write request unit 85 is required to process a write request for the discontinuous data. The rest of the configuration and operation is the same as in the first embodiment.

Next, a description will be given of advantages of the fourth embodiment.

According to the fourth embodiment, when payload data is written before the completion of the error check, it is ensured that existing valid sections are not overwritten by the payload data, so that post-processing, required when any error is found in a packet, is advantageously simplified when executed in post-processing unit 90, as is the case with the second and third embodiments. Also, since a payload data write request is always made before an error check irrespective of how valid sections are located, the fourth embodiment can advantageously reduce communication time.

Also, when a payload of a received packet overlaps with valid sections, overlapping portions of the payload data need not be written, so that the fourth embodiment can advantageously reduce a payload write time and the time that system bus 5 is occupied during write of the payload data.

On the other hand, attention should be paid to the operation of giving preference to previously defined valid sections at all times when payload data overlaps with the valid section because this operation violates the specifications of TCP. Specifically, in TCP, when the data portion of a received packet starting from the rear side of a leading portion of the same packet overlaps a valid section, the received packet is given a higher priority and therefore is written over the valid section, however, such a data portion is not either written over the valid section in the fourth embodiment. However, since data written the first time hardly differs in content from payload data which is written at a later time in normal communications apparatuses, it is contemplated that preference may be given to any data without there being a difference in actual result. Therefore, it is determined that such an operation would not cause any problem in practice.

Fifth Embodiment

Reception processing unit 8 of RDMA communications apparatus 9 according to a fifth embodiment comprises the configuration illustrated in FIG. 9, just like reception processing units 8 of RDMA communications apparatuses 9 according to the second and third embodiments. Then, the fifth embodiment is the same as the fourth embodiment in that protocol processing unit 84 compares a received packet with valid sections in application memory area 31 when it requests payload data write request unit 85 to write the received packet, and requests payload write request unit 85 to write only non-overlapping data portions before the completion of a packet error check, if the data overlaps with any valid section, but differs from the fourth embodiment in that, when no error is found upon completion of the packet error check, payload data write request unit 85 writes a portion of data which would have been essentially written but could not be written due to an overlap in the data.

Next, a description will be given of advantages of the fifth embodiment.

In the fifth embodiment, when a payload of a packet overlaps with a valid section in application memory area 31, a non-overlapping portion is written before an error check is made, and an overlapping portion is written after the error check has been made, so that only the overlapping portion need be transferred after the error check, thus making it possible to advantageously reduce a communication time more than in the second and third embodiments.

Sixth Embodiment

Reception processing unit 8 of RDMA communications apparatus 9 according to a sixth embodiment comprises the configuration illustrated in FIG. 9, just like reception processing units 8 of RDMA communications apparatuses 9 according to the second, third, and fifth embodiments. Then, the sixth embodiment differs from the fourth and fifth embodiments in that protocol processing unit 84 compares a received packet with valid sections in application memory area 31 when it requests payload data write request unit 85 to write payload data of the received packet, and writes the data intended for write processing from the head to the first overlap, when data overlaps with the valid sections, before the completion of an error check, and writes remaining data that is intended for the processing when no error is found after the completion of the packet error check. The rest of the configuration and operation is the same as in the fourth and fifth embodiments.

Next, a description will be given of advantages of the sixth embodiment.

The sixth embodiment can advantageously simplify processing as compared with the fourth and fifth embodiments, because payload data write request unit 85 need not divide a single write processing operation into a plurality of stages for processing, and can also reduce the processing required for each of a plurality of times of transfer and overhead associated with the transfer of the payload.

Seventh Embodiment

Figure 10:
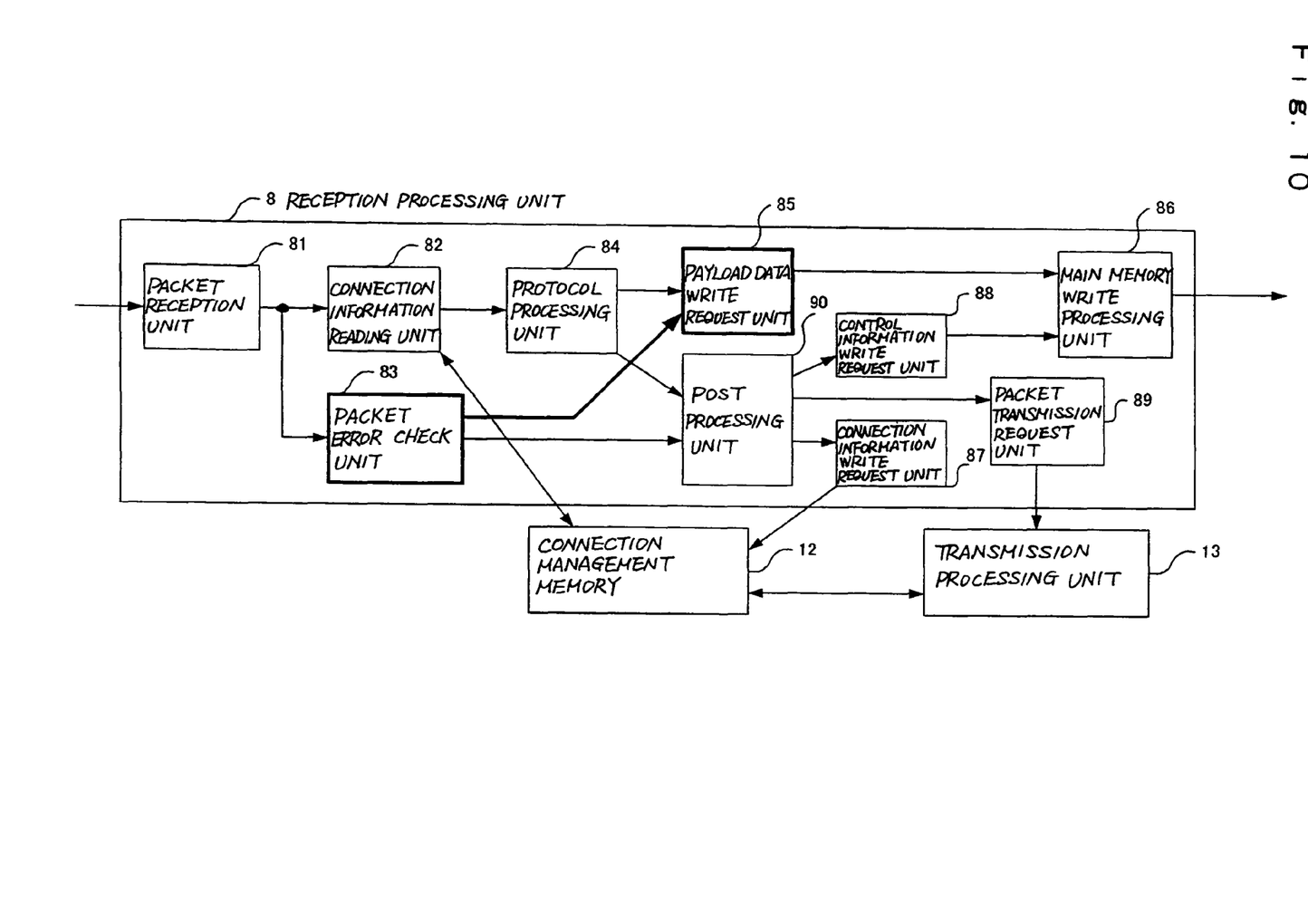
FIG. 10 is a block diagram illustrating an exemplary configuration of a reception processing unit within an RDMA communications apparatus according to a seventh embodiment of the present invention.

Referring to FIG. 10, reception processing unit 8 of RDMA communications apparatus 9 according to a seventh embodiment of the present invention differs from the first embodiment in that packet error check unit 83 notifies payload data write request unit 85 of the result of an error check, such that payload data write request unit 85, upon receiving notification of errors in a received packet from packet error check unit 83, has a function of aborting payload data write processing for the received packet, even if the payload data is being written. The rest of the configuration and operation is the same as in the first embodiment.

Next, a description will be given of advantages of the seventh embodiment.

The seventh embodiment has the advantage of reducing useless payload data transfers to reduce the processing amount of reception processing unit 8 and a time for which system bus 5 is occupied by aborting the payload write processing when any error is found in a received packet. In this connection, the function of aborting payload write processing when any error is found in a received packet can be applied as well to the second to sixth embodiments.

Eighth Embodiment

Reception processing unit 8 of RDMA communications apparatus 9 according to an eighth embodiment comprises the configuration illustrated in FIG. 4, just like reception processing unit 8 of RDMA communications apparatus 9 according to the first embodiment. Then, the eighth embodiment differs from the first embodiment in that protocol processing unit 84 does not perform calculations for post-processing required when any packet error is found, but notifies post-processing unit 90 of information required for post-processing when any packet error is found, and post-processing unit 90 performs calculations for the post-processing required when any error is found to execute the post-processing only after packet error check unit 83 finds an error. Specifically, when payload data is written with some portion thereof overlapping with a valid section, reception processing unit 8 requires write processing for calculating a new valid section when an error is found. In regard to this processing, in the first embodiment, protocol processing unit 84 executes this processing without waiting for the result of an error check in packet error check unit 83, whereas in the eighth embodiment, post-processing unit 90 executes this processing only when any error has been found after the completion of an error check in packet error check unit 83. The rest of the configuration and operation is the same as in the first embodiment.

Next, a description will be given of advantages of the eighth embodiment.

The eighth embodiment is advantageous in that since processing that is required when errors are found in the post-processing is performed only when errors have actually been found in a packet, the processing load can be reduced when no error is found, as compared with the first embodiment.

The eighth embodiment is also advantageous in that protocol processing unit 84 need not calculate the processing required upon detection of errors in a normal state because it is thought that errors are rarely found in a packet in a data transfer between normal RDMA communications apparatuses 9 in a stable network.

While several embodiments of the present invention have been described above, the present invention is not limited to the foregoing embodiments, but can be additionally modified in a variety of ways. Also, the functions of the communications apparatus according to the present invention can be implemented not only in hardware, as a matter of course, but also by a computer and a communication program. The communication program is recorded and provided on a computer readable recording medium such as a magnetic disk, a semiconductor memory and the like, and read by a computer when the computer is turned on, thereby causing the computer to function as the RDMA communications apparatus in each of the embodiments described above.

According to the present invention, the amount of delay can be reduced from the time that a packet is received until the time that payload data is written into an application memory area. This is because processing to write the payload data into the application memory area is started without waiting for the completion of an error check.

Also, according to the present invention, even with the use of a Layer 4 protocol such as TCP which can cause an area in which a payload of a packet is re-transmitted to partially or entirely overlap with an area in which a payload of a packet received in the past is stored, corrupted data will not be passed to an application program. This is because upon detection of an error, a valid section in the application memory area, which is overwritten by a write processing operation is returned to an invalid section in which normal data has not been stored, or payload data is written into the application memory area to the extent that valid sections in the application memory area are not overwritten.

While a preferred embodiment of the present invention has been described using specific terms, such description is for illustrative purposes only, and it is to be understood that changes and variations may be made without departing from the spirit or scope of the following claims.

What is claimed is:

1. A communications apparatus for directly transferring payload data included in a received packet to an application memory area, said apparatus comprising:
   an error check unit for checking the payload data for an error;
   a write processing unit for performing a write processing to write the payload data into the application memory area; and
   a protocol processing unit for causing said write processing unit to start said write processing for writing the payload data into the application memory area without waiting for a completion of the error check to an extent that a valid section in the application memory area is not overwritten by the payload data, wherein:
   said protocol processing unit checks whether or not the payload data intended for said write processing overlaps with a valid section in the application memory area, and causes said write processing unit to write a portion of the payload data which does not overlap with the valid section into the application memory area without waiting for the completion of the error check when at least a part of the payload data does not overlap with the valid section, and
   said protocol processing unit causes said write processing unit to write a data portion of the payload data which overlaps with a valid section into the application memory area if no error is found after the completion of the error check.

2. A communications apparatus for directly transferring payload data included in a received packet to an application memory area, said apparatus comprising:
   an error check unit for checking the payload data for an error;
   a write processing unit for performing a write processing to write the payload data into the application memory area; and
   a protocol processing unit for causing said write processing unit to start said write processing for writing the payload data into the application memory area without waiting for a completion of the error check to an extent that a valid section in the application memory area is not overwritten by the payload data, wherein:
   said protocol processing unit checks whether or not the payload data intended for said write processing overlaps with a valid section in the application memory area, and causes said write processing unit to write a data portion of the payload data from a head to immediately before a first overlap into the application memory area without waiting for the completion of the error check when at least a part of the payload data does not overlap with the valid section.

3. The communications apparatus according to claim 2, wherein:
   said protocol processing unit causes said write processing unit to write a remaining data portion of the payload data into the application memory area provided that no error is found after the completion of the error check.

4. A communications apparatus for directly transferring payload data included in a received packet to an application memory area, said apparatus comprising:
   an error check unit for checking the payload data for an error;
   a write processing unit for performing a write processing to write the payload data into the application memory area; and
   a protocol processing unit for causing said write processing unit to start the write processing for writing the payload data into the application memory area without waiting for a completion of the error check, and upon a detection of the error, returning a valid section in the application memory area overwritten by the write processing to an invalid section which has not stored normal data, wherein:
   said protocol processing unit previously calculates a post-processing which should be performed when an error is found, and a post-processing which should be performed when no error is found, without waiting for the completion of the error check.

5. A communications apparatus for directly transferring payload data included in a received packet to an application memory area, said apparatus comprising:
   an error check unit for checking the payload data for an error;
   a write processing unit for performing a write processing to write the payload data into the application memory area; and
   a protocol processing unit for causing said write processing unit to start the write processing for writing the payload data into the application memory area without waiting for a completion of the error check, and upon a detection of the error, returning a valid section in the application memory area overwritten by the write processing to an invalid section which has not stored normal data, wherein:
   said protocol processing unit precalculates a post-processing which should be performed when no error is found without waiting for the completion of the error check, and calculates a post-processing which should be performed when the error is found at a time the error is found.

* * * * *